United States Patent

Zuleeg et al.

[15] 3,701,043

[45] Oct. 24, 1972

[54] NEGATIVE RESISTANCE LIGHT EMITTING DIODE DEVICE

[72] Inventors: Rainer Zuleeg, Huntington Beach; Uri Ranon, Pacific Palisades, both of Calif.

[73] Assignee: McDonnell Douglas Corporation

[22] Filed: Feb. 16, 1970

[21] Appl. No.: 11,410

[52] U.S. Cl...........331/94.5, 317/234.10, 307/107 G

[51] Int. Cl...............................................H01s 3/18

[58] Field of Search ................331/94.5; 317/234.10; 307/107 G

[56] References Cited

UNITED STATES PATENTS

| | | | |
|---|---|---|---|
| 3,267,294 | 8/1966 | Dumke et al. | 307/258 |
| 3,447,044 | 5/1969 | Sandbank et al. | 317/234 |
| 3,577,018 | 5/1971 | Wada et al. | 307/299 |
| 3,526,851 | 9/1970 | Pankove | 331/94.5 |
| 3,548,335 | 12/1970 | Willett | 331/94.5 |
| 3,551,848 | 12/1970 | Rossoff | 332/7.51 |
| 3,585,520 | 6/1971 | Yanai et al. | 331/94.5 |
| 3,599,000 | 8/1971 | Yanai et al. | 250/211 R |

OTHER PUBLICATIONS

Lanza, IBM Tech. Discl. Bull., Vol. 10, No. 5, October 1967 p. 593.

Dyment et al., Applied Physics Letters, Vol. 11, No. 9, November 1967, pp. 292–294.

D' Asaro et al., IEEE J. Quantum Electronics, Vol. E–4, No. 4, April 1968, pp. 164–167.

*Primary Examiner*—Ronald L. Wibert
*Assistant Examiner*—R. J. Webster
*Attorney*—Walter J. Jason, Donald L. Royer and D. N. Jeu

[57] ABSTRACT

Diode device comprising a light emitting diode fabricated of a semiconductor having bulk negative resistance properties. The diode includes a light emitting $P^+N$ junction and a N-type layer or section of predetermined resistivity and geometry. The diode device has a voltage-current characteristic including two current-controlled, negative resistance portions separated by a region wherein the device is unstable and produces free oscillations which are in phase with intensity variations simultaneously produced in the emitted light. Bistable operation of the device can be obtained by suitable placement of its load line through either of the negative resistance portions. A diode device embodiment including a Fabry-Perot cavity structure therein produces a coherent light beam which can be readily modulated at microwave frequencies.

3 Claims, 9 Drawing Figures

INVENTORS
RAINER ZULEEG
URI RANON
BY
- AGENT -

INVENTORS
RAINER ZULEEG
URI RANON
BY
Dock N. Jeu
- AGENT -

INVENTORS
RAINER ZULEEG
URI RANON
BY
Dock N. Jou
- AGENT -

INVENTORS
RAINER ZULEEG
URI RANON
BY
Dodd M. Jen
-AGENT-

NEGATIVE RESISTANCE LIGHT EMITTING DIODE DEVICE

CROSS-REFERENCE TO RELATED APPLICATION

A process for making a single gate field-effect transistor, wherein such process can be partially applied in fabricating this invention, is shown, described and claimed in a copending patent application of Rainer Zuleeg, Ser. No. 811,154 filed Mar. 27, 1969 for Multichannel Junction Field-Effect Transistor and Process.

BACKGROUND OF THE INVENTION

Our present invention relates generally to semiconductor devices and more particularly to a negative resistance, light emitting diode device.

Stimulated emission of radiation due to excitation of a fluorescent material is well known and standard gallium arsenide (GaAs) light emitting diodes which convert electrical energy to infrared radiation are commercially available. In the standard GaAs light emitting diode, current increases nonlinearly with voltage and infrared radiation is emitted from the diode's PN junction. Similarly, the Gunn effect; i.e., semiconductor bulk negative resistance properties, is also well known and standard N-type GaAs Gunn diodes which provide continuous wave operation at oscillation frequencies from 1 to 50 gigahertz (GHz) are readily available. There is, however, no known device which combines or couples light emission of a diode with bulk negative resistance properties in an integrated structure.

SUMMARY OF THE INVENTION

Briefly, and in general terms, our invention is preferably accomplished by providing a diode device including a light emitting diode which is fabricated of a semiconductor having bulk negative resistance properties. The diode includes a $P^+N$ junction suitably disposed to emit light therefrom and a N-type layer or section of material having a predetermined resistivity and geometry (e.g., length, width and thickness) for proper operation of the diode device.

The voltage-current characteristic of the diode device exhibits three distinct regions with generally increasing voltage and current. The device is stable and emits relatively little light in the first region where most of the potential drop of the applied voltage lies across the $P^+N$ junction. Instabilities prevail throughout the second region, however, where most of the voltage drop occurs across the N-type layer or section. A suitably placed load line in the second region produces free oscillations of a frequency which is a function of the current (i.e., applied voltage) and temperature of the device. Light emission is coupled with the negative resistance properties in the second region and the current oscillations of the device are in phase with the intensity variations simultaneously produced in the light emitted therefrom. The device is stable in the third region but has intense light emission.

Current-controlled, negative resistive resistance portions of the voltage-current characteristic appear at the transitions from the first to second regions and the second to third regions of the characteristic. Bistable operation of the diode device can be obtained by placing its load line near either of such transitions to establish two stable state points on the characteristic at either negative resistance portions thereof. A diode device embodiment including a Fabry-Perot cavity structure therein produces a coherent light beam which can be readily modulated at microwave frequencies by mounting such a laser device in a tunable cavity resonator.

BRIEF DESCRIPTION OF THE DRAWINGS

OUr invention will be more fully understood, and other features and advantages thereof will become apparent, from the description given below of certain exemplary embodiments of the invention. The description is to be taken in conjunction with the accompanying drawings, in which.

DESCRIPTION OF THE PRESENT EMBODIMENTS

Figure 1:
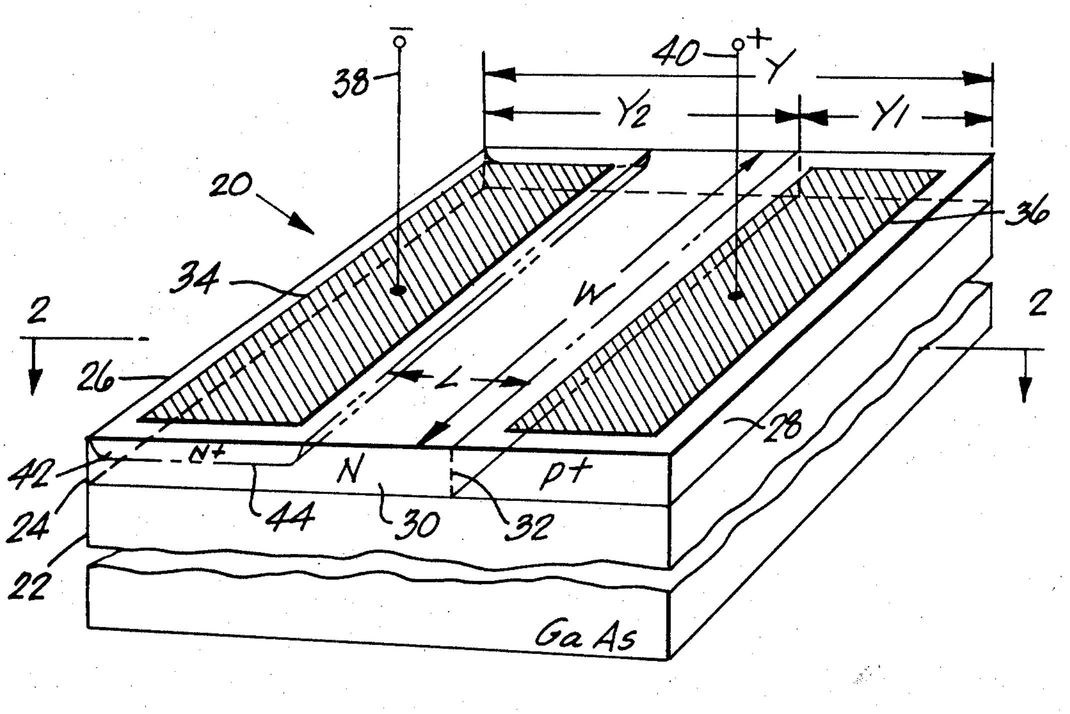
FIG. 1 is a fragmentary perspective view, somewhat diagrammatically shown, of an illustrative embodiment of a diode device constructed according to this invention.

FIG. 1 is a fragmentary and enlarged perspective view, somewhat diagrammatically shown, of one illustrative embodiment of our invention. A negative resistance, light emitting diode device 20 of a planar form broadly includes a semi-insulating substrate 22 and a mesa 24 formed thereon. The mesa 24 is more evidently of a mesa structure where the substrate 22 is laterally larger in area than the mesa, as when the same substrate supports other similar mesas. The substrate 22 can be a wafer of gallium arsenide (GaAs) and the mesa 24 can be formed from a layer 26 of N-type GaAs grown on the wafer by vapor phase epitaxy using arsenic tri-chloride ($AsCl_3$), for example. By sputtering a film of silica ($SiO_x$) of about 4,000 angstroms (A) thickness on appropriate areas of the surface of the N-type GaAs layer 26, a diffusion mask was obtained for diffusion of zinc (Zn) to the unmasked areas and into the N-type GaAs layer of form a strip 28 of $p^+$-type material of high carrier concentration (carrier density about $10^{19}$ $cm^{-3}$) and a remaining strip 30 of N-type material with a $P^+N$ junction 32 therebetween. Silica is represented as $SiO_x$ because in addition to the predominate ordinary silica $SiO_2$, there can be some small amounts of pure silicon (Si) and dissolved silicon monoxide (SiO) therein due to the temperature and pressure conditions involved. The Zn diffusion penetrates through the N-type GaAs layer 36 which is, for example, approximately 5 microns (μm) thick with a donor concentration in the range of $10^{14}$ to $10^{15}$ $cm^{-3}$.

Metallic ohmic contacts 34 and 36 were formed by evaporating gold-germanium (Au-Ge) on selected surface areas of the strips 28 and 30, and alloying the Au-Ge thereon at, for example, 520° C in a reducing atmosphere of hydrogen ($H_2$). The contact 36 can also be of Au-Ge (preferably) because of the $P^+$-type material of strip 28. Leads 38 and 40 are suitably attached to the contacts 34 and 36, respectively. A strip 42 of $N^+$-type material having a $N^+N$ junction 44 is produced under the contact 34 by the alloying process. The $N^+$-type strip 42 in the N-type strip 30 constitutes an ohmic contact therefor. The $N^+$-type strip 42 is, of course, not required in certain (N-type) semiconductors other than GaAs to provide an ohmic contact thereto.

A mesa structure can be formed by evaporating wax through a mechanical mask to cover a square area including the contacts 34 and 36, and then chemically etching away the remaining (uncovered) portions of the strips 28 and 30, leaving a mesa structure on the substrate 22 after dissolving and removing the wax covering. This can then be followed by thermocompression bonding of leads 38 and 40 to the contacts 34 and 36, respectively. Greater details of a similar process are shown, described and claimed in the application Ser. No. 811,154 of Rainer Zuleeg, which is fully cross-referenced above. The device 20 is subsequently mounted on a suitable (type TO–5) header with the substrate 22 floating.

It is noted that other semiconductors such as indium phosphide (InP), cadmium telluride (CdTe) and other direct gap (radiative recombination) semiconductors can be used besides BaAs in this invention. Also, instead of a $P^+N$ junction, a PN junction can be utilized to provide light emission, but with low efficiency. A $N^+P$ junction (in a suitable semiconductor) can likewise be used instead of the $P^+N$ junction. However, it is preferred to have the P carrier concentration higher than the N since light is produced in the P-type material due to the injection of electrons therein.

Figure 2:
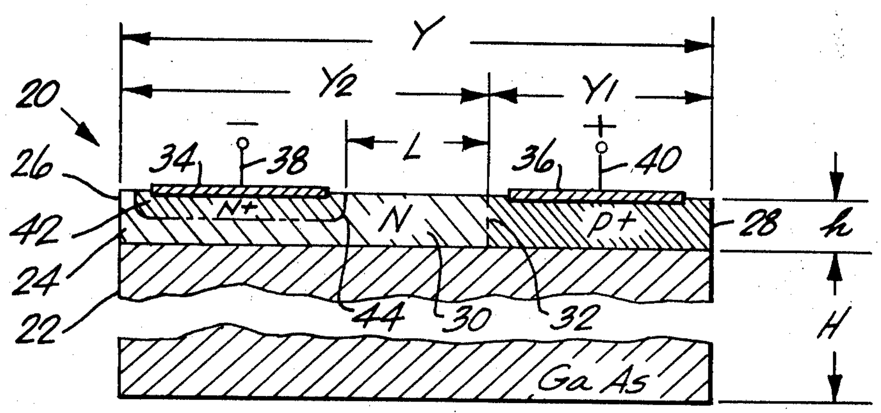
FIG. 2 is a fragmentary sectional view of the diode device as taken along the line 2—2 indicated in FIG. 1.

FIG. 2 is a fragmentary sectional view of the device 20 as taken along the line 2—2 indicated in FIG. 1. The substrate 22 is, for example, a wafer of semi-insulating GaAs having a resistivity greater than $10^4$ ohm-cm. Its size can be 1,000 by 1,000 microns square with a thickness or height H of approximately 250 microns. The epitaxial layer 26 can have a thickness or height $h$ of 5 microns and an overall mesa length Y of 1,000 microns in this exemplary embodiment. The length Y of mesa 22 can be equal to its width W which is indicated in FIG. 1. The $P^+$-type strip 28 has a length Y1 of about 400 microns and a width of about 1,000 microns, and the N-type strip 30 has a length Y2 of about 600 microns and a width of about 1,000 microns, for example. The length L from the $P^+N$ junction 32 to the right side of $N^+N$ junction 44 can be 50 microns, and the evaporated contacts 34 and 36 can be each about 380 by 980 microns in size. The thickness $h$ is usually in the range of 2 to 8 microns and length L can be any length from 2 to 200 microns as may be required for the frequency of oscillation. It is, of course, to be understood that the particular types of materials and dimensions noted herein are given as examples only and are not intended to limit the scope of our invention in any manner.

For proper operation of the diode device 20, a substantial internal resistance must be maintained in series with the $P^+N$ diode established by the junction 32. This resistance $R_s$ is formed by the epitaxial layer 26, its geometry and resistivity and is given by the relationship $R_s = \rho L/hW$, where $\rho$ = resistivity in ohm-cm, $L$ = length in cm, $h$ = height in cm and $W$ = width in cm. Thus, for $\rho = 1$ ohm-cm, $L = 5 \times 10^{-3}$ cm, $h = 3 \times 10^{-4}$ cm and $W = 2.5 \times 10^{-2}$ cm, then $R_s = 670$ ohms, approximately. Where $h = 5 \times 10^{-4}$ cm and $W = 1 \times 10^{-1}$ cm instead, then $R_s = 100$ ohms, for example. Values from 1 to 700 ohms are typical for $R_s$ in present devices.

Figure 3:
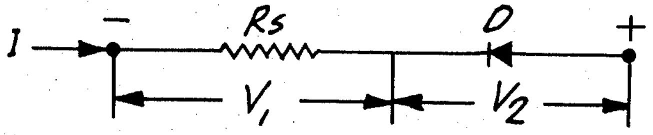
FIG. 3 is a circuit diagram of an equivalent circuit for the diode device shown in FIGS. 1 and 2.

FIG. 3 is a circuit diagram of the equivalent circuit of the diode device 20 shown in FIGS. 1 and 2. At low currents, the direct current resistance of diode D is much larger than $R_s$ and most of the voltage drop occurs across the diode. Thus, $V_2$ is much greater than $V_1$. With increasing current, however, the d.c. resistance of diode D becomes smaller and eventually an approximately linear relationship exists with the current $I$. In this instance, $I = V_1/R_s$, approximately.

Two effects have to be considered with any direct recombination semiconductor such as GaAs. First, at a certain threshold current density, light emission takes place from the $P^+N$ junction 32 as a consequence of the injection of electrons into the $P^+$-type region 28 in which direct recombination of electrons and holes occurs, releasing photons at a wavelength $\lambda = 1.27/E_g$ where $\lambda$ is the wavelength in microns and $E_g$ is the semiconductor energy gap in electron volts (ev). Second, at higher currents, the field builds up across $R_s$ and when the critical field (for electron drift velocity saturation in GaAs) of about 3,000 v/cm is exceeded, the well-known Gunn instabilities will appear across the length L at a frequency inversely proportional thereto. These dipole layer domains travel from the $N^+$-type ohmic contact region 42 to the $P^+N$ junction 32 and cause interaction therewith.

Figure 4:
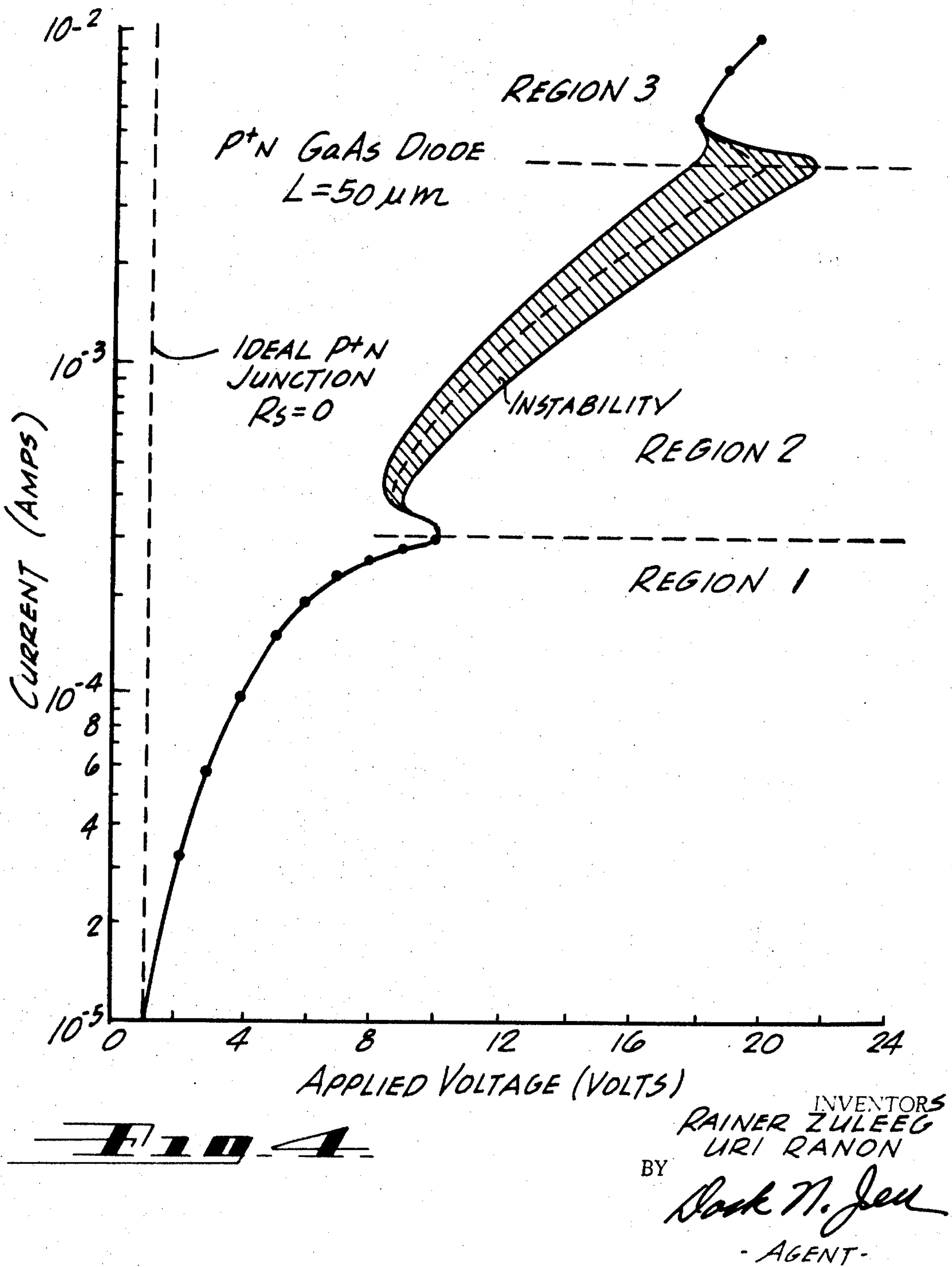
FIG. 4 is a graph showing a typical forward voltage versus current characteristic for the diode device of FIGS. 1, 2 and 3.

FIG. 4 is a graph showing a typical forward voltage versus current characteristic for the diode device 20. It can be seen that there are three distinct regions which are identified as regions 1, 2 and 3. Region 1 is a stable region where most of the potential drop of the applied voltage lies across the $P^+N$ junction 32, because the d.c. resistance of the the diode D (FIG. 3) is much larger than the series resistance $R_s$. With increasing voltage and current, the voltage drop shifts and the field builds up across the N-type region or strip 30. A current-controlled negative resistance appears when the field reaches the critical value of about 3,000 v/cm across the N-type strip 30. Simultaneously, increased light emission takes place from the edge of the $P^+N$ junction 32.

In region 2, near-sinusoidal oscillations of different frequencies were produced by merely shifting the load line in that region through changes in the applied voltage, although the voltage-current characteristic has a positive and constant slope. Bistable switching can only be produced in narrow regions at the start and end of this unstable region 2. Oscillating conditions prevail in region 2 and the light emission intensity varies in phase with the current amplitude through the diode device 20. The frequency of oscillation is a function of the current (i.e., applied voltage) and temperature. Assuming that most of the voltage drop occurs across the relatively large series resistance $R_s$, the current through this resistance and the diode D is given by $I = V_a/R_s$, approximately. Since in the equivalent circuit representation of FIG. 3, the diffusion capacitance (not indicated) across the diode D is in series with the resistance $R_s$, the frequency of the (resistance-capacitance relaxation) oscillation can be approximated by the following relationship:

$$f_{osc} \cong 2kT/(qt(V_a)) \quad \text{[Eq. 1]}$$

where $k$ is the Boltzmann constant $T$ is the absolute temperature $q$ is the electron charge $t$ is the effective radiative recombination lifetime of electrons $V_a$ is the applied voltage In region 3, the diode device 20 is stable but has intense light emission from its $P^+N$ junction 32. Another current-controlled negative resistance portion appears in the voltage-current characteristic of FIG. 4 at the transition from region 2 to 3. Bistable operation of the device 20 is possible at the transitions from region 1 to 2 and 2 to 3. The bistable mode of operation is not as pronounced with present devices when the load line is placed near the transition of region 1 to 2 to establish two stable state points as when it is placed near the transition of region 2 to 3 to establish two other stable state points. Switching can be accomplished by electrical, electronic or magnetic means.

Figure 5:
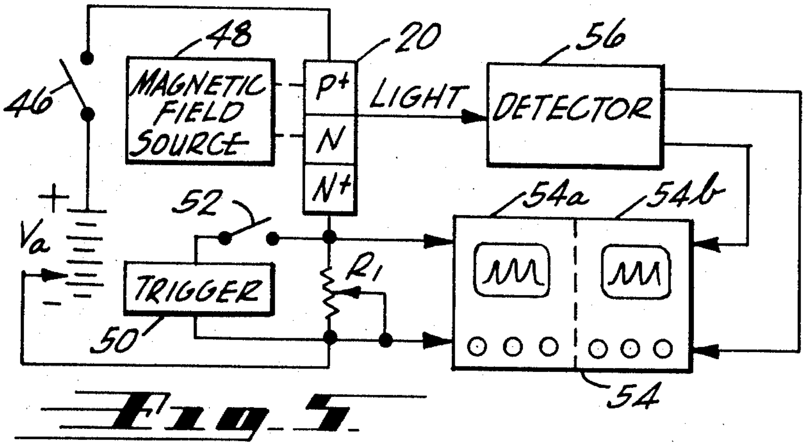
FIG. 5 is a circuit diagram of a test circuit used to measure the operational characteristics of the diode device of FIGS. 1 and 2.

FIG. 5 is a circuit diagram of a test circuit which can be used to operate and measure the operational characteristics of the diode device 20. Variable load resistor $R_1$ is connected in series with the device 20 and this series combination is connected to a variable voltage source $V_a$ through switch 46 (circuit ammeter and source voltmeter are not shown). Magnetic field source 48 can be electively energized and suitably positioned to apply an adjustable strength magnetic field in any chosen direction to the device 20. A source 50 operable to provide trigger signals such as positive and/or negative pulses can be connected across the resistor $R_1$ by closing switch 52. The output signal across the load resistor $R_1$ can be applied to oscilloscope 54a. Similarly, the light output from device 20 is sensed by detector 56 which provides a proportional electrical signal to oscilloscope 54b to produce a trace for comparison with that on the oscilloscope 54a. The oscilloscopes 54a and 54b also represent a single dual trace oscilloscope 54 which can be used instead of two synchronized units.

Operation of the diode device 20 is achieved by adjusting the resistor $R_1$ and source $V_a$ to appropriate values, and then closing the switch 46. When the load line is suitably positioned near either of the transitions from region 1 to 2 or 2 to 3, switching between a pair of established stable state points can be accomplished by closing the switch 52. The trigger source 50 can then be operated to provide a positive pulse (+2 volts, for example) to switch from a stable lower (current) point to a higher one. This condition can be subsequently returned to the original condition by operating the source 50 to provide a negative pulse (−2 volts, for example) or, alternatively, by simply opening and closing the power switch 46.

Figure 6:
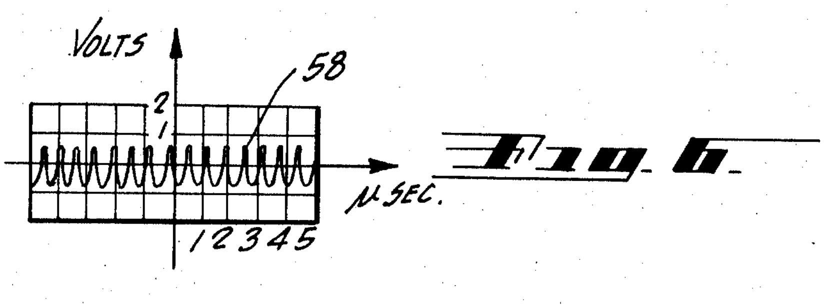
FIG. 6 is a graph showing a curve which illustrates the oscillation waveform produced by the diode device for certain load and operating conditions thereof.

FIG. 6 is a graph illustrating an oscillation curve 58 having a frequency $f_{osc} = 1.7$ megahertz (MHz) at 300° K and resulting from a load resistance $R_1$ of 1 kilohm and $V_a = 16$ volts. The frequency of oscillation in the region 2 (FIG. 4) was found to be inversely proportional to the applied voltage $V_a$; i.e., decreasing with increasing voltage, and directly proportional to the temperature T; i.e., increasing with increasing temperature. At room temperature, with $f_{osc} = 1.7$ MHz and $V_a = 16$ volts for the GaAs diode device, a value of $t = 2.2 \times 10^{-9}$ sec is given by Equation 1, for example. Frequencies of oscillation from 200 kilohertz (kHz) at 77° K to 10 MHz at 400° K have been produced with the described diode device 20 structure. These are relaxation oscillations which are of lower frequencies than the Gunn domain oscillations.

Figure 7:
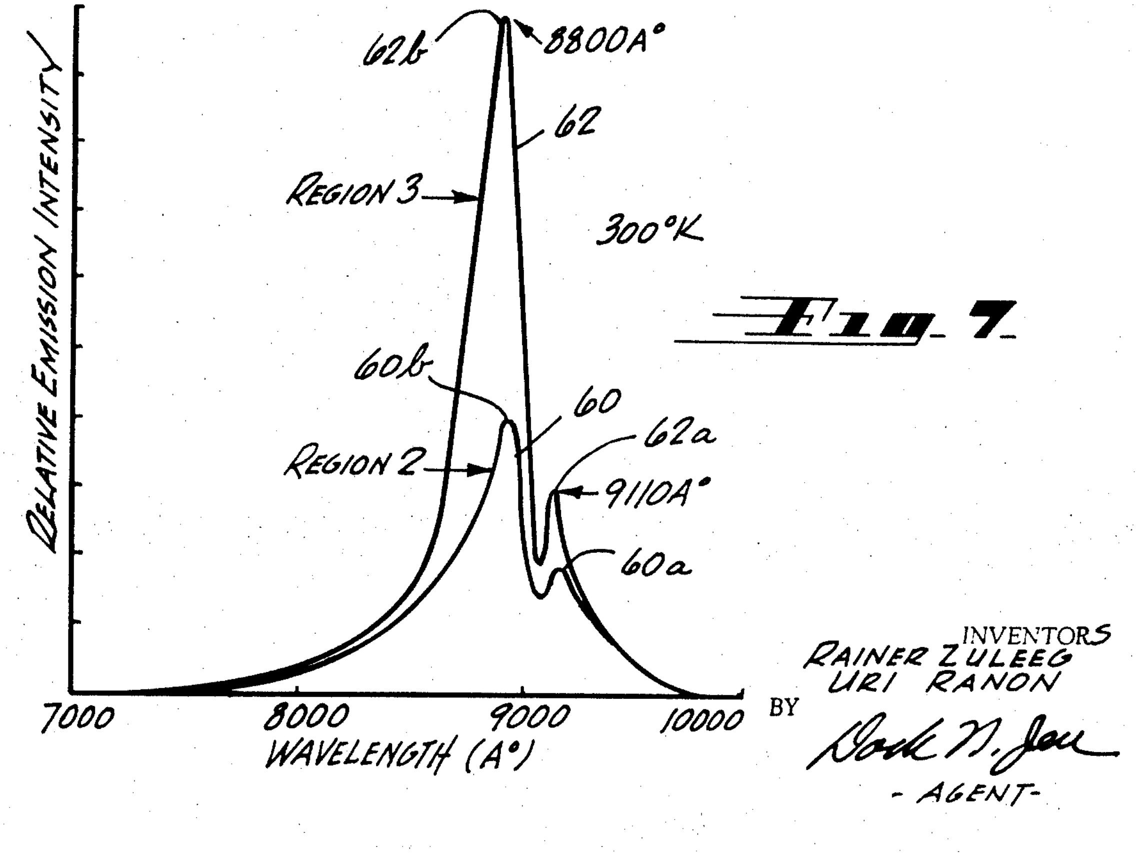
FIG. 7 is a graph illustrating the spectral response of the diode device when biased to certain operating conditions.

FIG. 7 is a graph showing curves 60 and 62 of the spectral response of the diode device 20 when biased respectively in regions 2 and 3 (FIG. 4). The light emission and its distribution along the $P^+N$ junction 32 edge was photographed with infrared film. The negative resistance instabilities in region 2 are believed to be either produced by high field Gunn domains interacting with the light emitting $P^+N$ junction 32 or arise from current-controlled negative resistance originating from filamentary current flow. In the region 2, light emission takes place over most of the junction length whereas, in region 3, the emission is generally concentrated in one area. The current-controlled negative resistance portion in the transition from region 2 to 3 appears to be caused by a filamentary current flow, which was photographed in experimental specimens of the diode device 20. From these results, it can be concluded that two different operational mechanisms exist in the observed regions. The two emission peaks of each curve (60a and 60b of curve 60 and 62a and 62b of curve 62) correspond to the band-to-impurity (shallow acceptor) and band-to-band transitions, respectively.

The effects of a magnetic field on the forward voltage versus current characteristic and oscillation frequencies of the diode device 20 have been determined by energizing the magnetic field source 48 (FIG. 5) and measuring the results when a magnetic field is applied in one then in the opposite direction perpendicular to the plane of the mesa 24 (FIG. 1), and when the magnetic field is applied in one then in the reversed direction in the plane of the mesa (perpendicular to the direction of current flow). A field of 6,000 gauss applied perpendicular to the plane of the mesa 24 has the most pronounced effect on the negative resistance characteristic portion between regions 1 and 2 (FIG. 4). This field causes a flattening of the whole voltage-current characteristic in the directions of higher voltage and lower current. When the magnetic field is applied in the plane of the mesa 24, perpendicular to the direction of current flow, the negative resistance characteristic portion between regions 1 and 2 increases and is moved towards lower voltage and higher current.

No observable effect on the voltage-current characteristic was noticed with the magnetic field oriented in the direction of current flow. However, the frequency of oscillation increased by about 10 percent (at 1 MHz) when the field was applied to the device 20 in this direction. Because of the large changes in the characteristic for the other orientations of the applied magnetic field, the device can be switched in and out of oscillation by such field. Of course, this can be done in either a reversible or non-reversible way, depending upon the load line and operating point thereon selected for the device.

Figure 8:
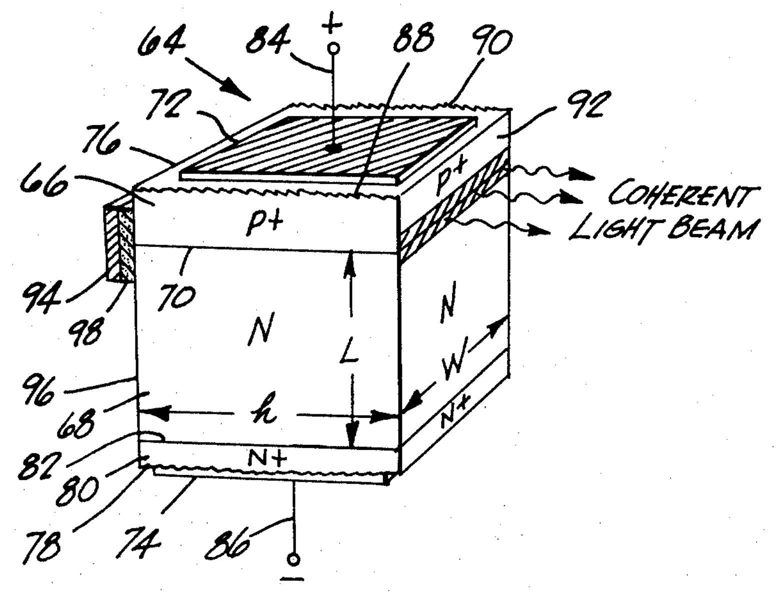
FIG. 8 is a perspective view, somewhat diagrammatically shown, of another embodiment of this invention wherein readily modulated coherent light is effectively emitted in one direction therefrom.

FIG. 8 is an enlarged and diagrammatic perspective view of an embodiment of this invention wherein readily modulated coherent light is produced from a diode device 64 including a Fabry-Perot cavity structure. The device 64 is of a sandwich form and has lower losses than the planar (substrate supported) diode device 20 shown in FIG. 1. It is similar to the device 20 in that the device 64 comprises a GaAs diode including a section 66 of $P^+$-type material and a section 68 of N-type material with a $P^+N$ junction 70 therebetween. Metallic ohmic contacts 72 and 74 are evaporated and alloyed to the upper and lower surfaces 76 and 78, respectively, of the device 64. The alloying process produces a section 80 of $N^+$-type material next to the lower contact 74 with a $N^+N$ junction 82 between the sections 68 and 80. Of course, leads 84 and 86 can be secured respectively to the contacts 72 and 74 by thermocompression bonding.

Rough surfaces 88 and 90 are formed (as by cutting the GaAs crystal to size with a wire saw) on two parallel sides of the device 64, and a cleaved surface 92 including a light emitting portion of the $P^+N$ junction 70 is oriented substantially at right angles to the rough surfaces. Length L, width W and thickness h of the N-type section 68 are as indicated in FIG. 8. The cleaved surface 92 comprises the front side of the Fabry-Perot cavity structure. A reflector plate 94 which can be a strip of Au is attached to the cleaved surface 96 of the device 64 along the junction 70 dispersed by a layer 98 of ordinary silica ($SiO_2$). The surface 96 is oriented substantially parallel to front surface 92 and comprises the back side of the cavity structure. Coherent light from the junction 70 at the front surface 92 can be modulated by either electrical or magnetic means at microwave frequencies in this embodiment of the invention.

Figure 9:
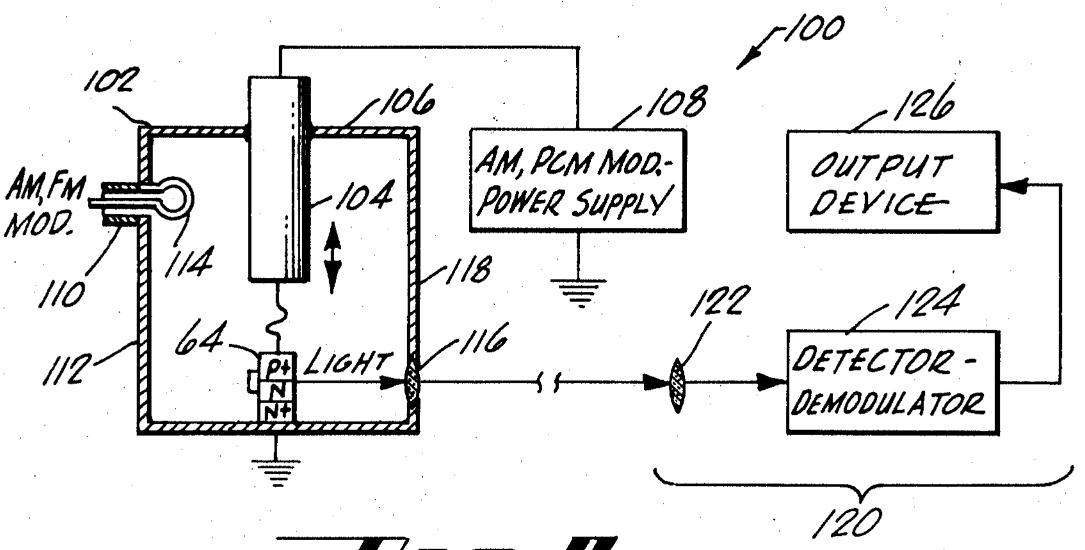
FIG. 9 is a sectional and diagrammatic view of a tunable cavity resonator mounting the diode device of FIG. 8 therein and transmitting modulated coherent light to a remote receiver.

FIG. 9 is a block diagram of a communication system 100 which includes a sectional view of a cavity resonator 102 mounting the diode device 64 therein. A cylindrical metallic (tuning) plunger 104 extends through and is insulated from the upper wall 106 of the resonator 102. The resonator 102 provides the high Q tuned circuit needed by the high Gunn frequencies. The lower end of plunger 104 is flexibly connected electrically by a thin conducting lead to the positive contact of device 64 and the upper end of the plunger is connected to amplitude, pulse code modulation and power supply means 108. The power supply corresponds to the source $V_a$ (FIG. 5) which can be varied in magnitude for amplitude modulation or suitably turned on and off (circuit opened and closed) for pulse code modulation. Of course, there is no load resistor $R_1$ (required for the relaxation oscillations) since such resistance has been replaced by a tuned circuit (resonator 102) which can be tuned to the frequency of the Gunn domain oscillations. Frequency or amplitude modulation can be effected by an electrical modulating signal provided on coaxial line 110 which connects through left side wall 112 to coupling loop 114 in the resonator 102. For frequency modulation, the frequency of the input signal on line 110 is relatively close to the tuned circuit's resonant frequency.

In a two-valley semiconductor such as GaAs, the frequency of the Gunn domain oscillations is equal to the average velocity of electrons distributed between the two conduction band (valley) minima divided by the length L (FIG. 1 or 2). Since such average velocity is constant for a particular semiconductor, the frequency of oscillation in the Gunn mode is inversely proportional to the length L. The frequency of the Gunn domain oscillations is, of course, higher than that of the relaxation oscillations.

The upper wall 106 is insulated from the direct current carried by the plunger 104 from the power supply but is effectively shorted to such plunger at the high alternating frequencies involved. The plunger 104 can be adjusted vertically to tune the resonator 102 to a frequency from 1 to 10 gigahertz (GHz), for example. The intensity-oscillating light carrier of the tuned frequency can be suitably modulated at microwave frequencies and passed through lens 116 mounted in the right side wall 118 of the resonator 102 to a remote receiver 120. The receiver 120 includes lens 122, detector-demodulator 124 and output device 126. The output device 126 can, for example, be a suitable display or recording device.

It is to be understood that the exemplary embodiments of this invention as described above and shown in the accompanying drawings are merely illustrative of, and not restrictive on, our broad invention and that various modifications in design, structure and arrangement may be made therein without departing from the true spirit of the invention.

We claim:

1. A negative resistance, light emitting diode device system comprising:

a light emitting diode fabricated of a semiconductor having Gunn domain and filament forming bulk negative resistance properties, said diode including first and second sections of respectively different first and second types of electrical conductivity material having a light emitting junction therebetween, and said second section having a predetermined resistivity and geometry for producing said domains and filaments therein;

first and second contact means for providing respective electrical connections to said first and second sections, said first and second contact means being adapted to be connected to a source of voltage, and said diode device has a forward voltage versus current characteristic which includes a region representative of unstable operation wherein oscillating conditions involving said domains and filaments prevail and light emission intensity from said light emitting junction varies in phase with current amplitude through said diode device, said first-type material is $P^+$-type material and said second-type material is N-type material, and said first and second sections are disposed in a generally vertical arrangement whereby a sandwich form of said diode device can be obtained, and including a thin layer of a third-type of material provided generally under said second contact means and constituting an ohmic contact for said second section, and wherein said third-type material is $N^+$-type material and said light emitting junction is spaced a predetermined distance vertically from said thin layer, said sandwich form of said diode device including a pair of rough vertical parallel surfaces and a pair of smooth vertical parallel surfaces for a Fabry-Perot cavity structure, and including reflector means affixed to one of said smooth surfaces over said light emitting junction portion thereof whereby an intensity-oscillating coherent light beam of a predetermined Gunn domain frequency as established essentially by said semiconductor and said predetermined distance, can be emitted from said light emitting junction portion of the other of said smooth surfaces; and a high Q tuned circuit means connected to said diode device for producing an intensity-oscillating coherent light beam of a resonant mode frequency of said predetermined Gunn domain frequency from said light emitting junction portion of said other of said smooth surfaces of said diode device, said high Q tuned circuit means comprising a resonator mounting said diode device therein and connected thereto for producing said intensity-oscillating coherent light beam of a resonant mode frequency of said predetermined Gunn domain frequency, and including means connecting with said resonator for modulating said light beam at microwave frequencies, said resonator including adjustable plunger means for tuning it to a selected resonant mode frequency and adapted to connect said source of voltage to said diode device in said resonator, and window means for transmitting said light beam through a wall of said resonator.

2. A negative resistance, light emitting diode device comprising:

a light emitting diode fabricated of a semiconductor having Gunn domain and filament forming bulk negative resistance properties, said diode including first and second sections of respectively different first and second types of electrical conductivity material having a light emitting junction therebetween, and said second section having a predetermined resistivity and geometry for producing said domains and filaments therein; and first and second contact means for providing respective electrical connections to said first and second sections, said first and second contact means being adapted to be connected to a source of voltage, and said diode device has a forward voltage versus current characteristic which includes, with increasing current, a first region representative of stable non-oscillatory and low light emission operation, a second region representative of unstable operation wherein oscillating conditions involving said domains and filaments prevail and light emission intensity from said light emitting junction varies in phase with current amplitude through said diode device, and a third region representative of stable non-oscillatory and intense light emission operation, said first and second sections being generally parallel and contiguous rectangular sections of a thin film layer of material and disposed in a generally lateral arrangement whereby a planar form of said diode device is obtained, and including a semi-insulating substrate for supporting said thin film layer with its laterally disposed sections, and wherein said first and second contact means are affixed respectively to the exposed faces of said first and second sections, said first-type material is $P^+$-type material and said second-type material is N-type material, and including a thin contact layer of a third-type of material provided generally under said second contact means and constituting an ohmic contact for said second section, and wherein said third-type material is $N^+$-type material and said thin contact layer is generally rectangular and disposed in a laterally parallel arrangement with an adjacent side spaced at a predetermined distance from said light emitting junction, and said characteristic includes current-controlled, negative resistance representative portions at transitions of said first to second regions and said second to third regions, respectively, and including a load resistance connected in series with said diode device and said source of voltage, said load resistance being of a predetermined value to establish a load line through said second region whereby relaxation oscillations having a frequency generally proportional inversely to applied voltage are produced by said diode device.

3. The invention as defined in claim 2 wherein said semiconductor is essentially gallium arsenide and said load resistance is of a predetermined value to establish said load line near one of said transition portions whereby a bistable diode device is obtained, and including trigger means connected to apply a signal to said diode device to switch the same from one stable state to another.

* * * * *